No. 873,220. PATENTED DEC. 10, 1907.
T. A. EDISON.
REVERSIBLE GALVANIC BATTERY.
APPLICATION FILED NOV. 23, 1903.

Witnesses:
Frank N. Lewis
Delos Holden

Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF ORANGE, NEW JERSEY, A CORPORATION OF NEW JERSEY.

REVERSIBLE GALVANIC BATTERY.

No. 873,220.  Specification of Letters Patent.  Patented Dec. 10, 1907.

Application filed November 23,1903. Serial No. 182,429.

*To all whom it may concern:*

Be it known that I, THOMAS A. EDISON, of Llewellyn Park, Orange, in the county of Essex and State of New Jersey, have invented certain Improvements in Reversible Galvanic Batteries, of which the following is a specification.

My invention relates to improvements in reversible galvanic batteries of the type invented by me wherein nickel hydroxid is opposed to finely-divided electrolytically active iron in an alkaline solution.

My object is to improve the output of such batteries, and to reduce the swelling of the depolarizing mass in the nickel-plated perforated pockets in which it is maintained under pressure.

Reference is hereby made to the accompanying drawing of which

Figure 1:
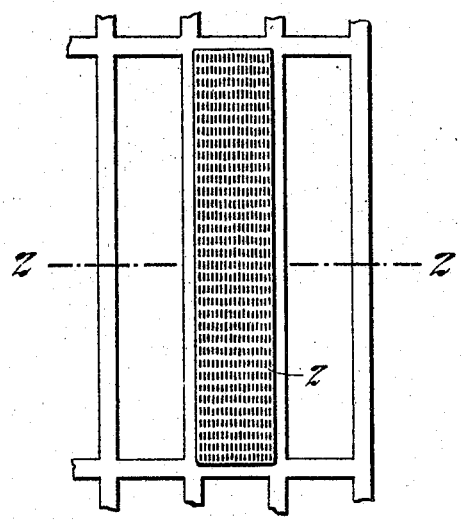
Figure 2:
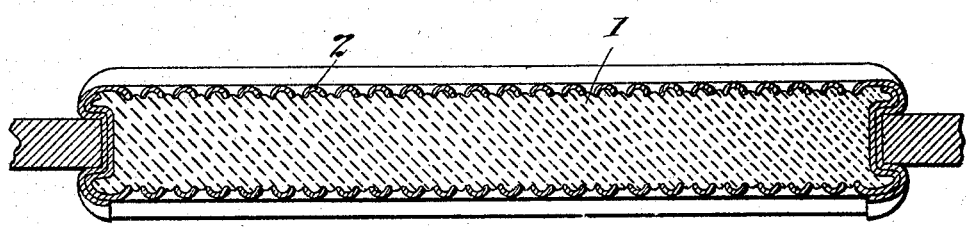

Figure 1 is a side view of a fragment of a storage battery grid in which one of the perforated pockets is held, and Fig. 2 is a section on line 2—2 of Fig. 1 on a greatly enlarged scale. I have discovered that when a small proportion (say 15 per cent.) of bismuth hydroxid is intimately mixed with nickel hydroxid and applied to the surfaces of flakes of an inert, insoluble conducting material, such as flake graphite, very superior results are obtained, the total capacity per unit of weight of the mixture being greater than when the same weight of nickel hydroxid is used alone, and the swelling of the two hydroxids together being less than when the same weight of nickel is used alone. I am unable at this time to explain the reason why these superior results are obtained, but the advantages are nevertheless derived.

The mixture of active materials 1 is preferably employed under pressure in perforated metallic pockets 2 as I have described in patents heretofore granted, and when so used, the reduction of the swelling becomes very important. Any suitable negative pole or oxidizable electrode may be used, having an insoluble active material, such as iron or cobalt, or having a soluble active material like zinc which dissolves in the solution during discharge, being plated out on the succeeding charging operation. Preferably, however, the negative pole electrode utilizes finely-divided electrolytically-active iron to which is preferably added a readily reducible metal (such as mercury, silver or copper), the whole being maintained under pressure in perforated pockets secured in suitable grids.

In making the improved electrodes I prefer to precipitate the two hydroxids together from their dissolved salts, as in this way a very intimate mixture of the two is secured. The precipitated hydroxids are washed free of impurities, and while in a moist condition are intimately mixed with a flake-like inert conducting material, preferably flake-graphite. This mixing is most effectively secured in a Chilean mill, the rollers of which are not heavy enough to pulverize the graphite flakes, and the mixing is continued until the mass is uniformly dark, and presents the appearance of graphite alone. In this condition the mixture of nickel and bismuth hydroxids will be distributed as extremely thin films over the surfaces of the graphite flakes, and will be in the most effective condition. The mixture is now applied within perforated pockets as heretofore explained, secured within openings in suitable grids, or any other mechanical arrangement may be utilized to support the active mass.

The negative pole or oxidizable electrode may be made in any suitable way, such as I have pointed out in former patents, and preferably utilizes as its active mass, a mixture of electrolytically-active finely-divided iron and mercury. The two electrodes are now immersed in an alkaline solution, such as a 20 per cent. solution of potassic hydrate, and the cell will then be ready for use. In charging the bismuth and nickel hydroxisd will be raised to a high condition of oxidation, the iron being reduced to the metallic state. When the cell is reversed, the iron will be oxidized to a low condition of oxidation, and the hydroxids will be reduced to lower hydroxids. The proportion of bismuth hydroxid used may be varied within quite wide limits, but excellent results have been secured when about 15 per cent. by weight of bismuth hydroxid and 85 per cent. by weight of nickel hydroxid have been used. It may be stated generally that owing to the expensive character of bismuth, the minimum quantity of bismuth hydroxid should be used that will give the required results under the desired conditions.

Having now described my invention, what I claim as new therein and desire to secure by Letters Patent, is as follows:

1. A depolarizing electrode for reversible galvanic batteries, containing a mixture of nickel hydroxid and bismuth hydroxid the proportion of the latter ingredient being much smaller than that of the former, substantially as set forth.

2. A depolarizing electrode for reversible galvanic batteries, containing a mixture of nickel hydroxid and bismuth hydroxid the proportion of the latter ingredient being much smaller than that of the former, and an inert flake-like conducting material on the surfaces of which the mixture is carried, substantially as set forth.

3. A depolarizing electrode for reversible galvanic batteries, containing a mixture of nickel hydroxid and bismuth hydroxid, and an inert flake-like conducting material on the surfaces of which the mixture is carried in the form of very thin films, substantially as set forth.

4. In a reversible galvanic battery, an alkaline electrolyte, a depolarizing electrode containing a mixture of nickel hydroxid and bismuth hydroxid the proportion of the latter ingredient being much smaller than that of the former, and an oxidizable electrode, substantially as set forth.

5. In a reversible galvanic battery, an alkaline electrolyte, a depolarizing electrode containing a mixture of nickel hydroxid and bismuth hydroxid the proportion of the latter ingredient being much smaller than that of the former, and an oxidizable electrode, containing finely divided electrolytically active iron, substantially as set forth.

This specification signed and witnessed this 20th day of Nov. 1903.

THOS. A. EDISON.

Witnesses:
 FRANK L. DYER,
 W. G. BEE.